Feb. 22, 1972           H. BOSCH           3,644,296

PROCESS FOR THE HIGH-MOLECULAR-WEIGHT
POLYMERIZATION OF LACTAMS
Filed Dec. 23, 1968

INVENTOR
HENDRIK BOSCH

By
Cushman, Darby & Cushman
ATTORNEYS

United States Patent Office

3,644,296
Patented Feb. 22, 1972

3,644,296
PROCESS FOR THE HIGH-MOLECULAR-WEIGHT POLYMERIZATION OF LACTAMS
Hendrik Bosch, Geleen, Netherlands, assignor to Stamicarbon N.V., Heerlen, Netherlands
Filed Dec. 23, 1968, Ser. No. 785,970
Claims priority, application Netherlands, Dec. 22, 1967, 6717621
Int. Cl. C08g 20/18
U.S. Cl. 260—78 L        2 Claims

ABSTRACT OF THE DISCLOSURE

A process and apparatus are disclosed for the preparation of high-molecular-weight polymerization products by ionogenic catalytic polymerization of lactams, in which one portion of the monomer is mixed with a catalyst and another portion with a promoter for accelerating the polymerization, after which these two components are mixed in the liquid state and introduced into a heated mould in which the polymerization takes place.

SUMMARY OF THE INVENTION

There is disclosed herein a process in which by means of a simple mixing device a homogeneous mixture can be prepared in so short a time that the increase in viscosity in the mixing device is extremely small.

BACKGROUND OF THE INVENTION

The rate at which the polymerization reaction proceeds depends on the concentration and nature of catalyst and promoter, and on the temperature at which the reaction takes place. By a suitable choice of these factors the polymerization can be effected within a time of from 2 to 15 min. In comparison with the manufacture of objects by injection moulding, this process is very attractive, since no use need be made of costly injection moulding machines and of the moulds employed therewith. A further advantage is that the moulding operation can take place at low, e.g. atmospheric, pressure, so that the objects obtained are substantially free from internal stresses.

However, due to the short time in which the polymerization takes place it is necessary to mix the two components as rapidly as possible, since, even after partial polymerization, the viscosity of the mixture to be polymerized rises so rapidly that difficulties may arise in filling the mould, in most cases it being impossible to distribute catalyst and promoter homogeneously in the monomer in such a short time. The result is that the polymerization of the mixture does not take place under the same conditions throughout the mould, this giving rise to irregularities in the moulded object, for example variations in size resulting from variations in polymerization shrinkage or in the properties of the material. Thus when a series of objects is formed in the same polymerization mould, these objects will not all have exactly the same dimensions.

The process hereinbefore described has the additional disadvantage that continuous operation is impossible, since an amount of starting material has to be mixed which is sufficient for one or more charges, after which the mixing device is emptied and one or more moulds are filled. The dwell time of the reaction material in the mixing device is so long that due to initial polymerization the viscosity of the reaction mixture at the moment of discharge is substantially higher than the viscosity of the original components. Due to this increase in viscosity, some of the mixture remains on the stirrer and on the walls of the mixing vessel after discharge of the contents thereof, where it continues to polymerize. The resulting encrustations have therefore frequently to be removed by cleaning operations.

It is the object of this invention to provide a process in which by means of a simple mixing device a homogeneous mixture can be prepared in so short a time that the increase in viscosity in the mixing device is extremely small.

This has been achieved in that, according to the invention, the one component is added to the other through a number of small apertures, while this other component is flowing through a conduit, in a place where this conduit links up with a downpipe which is so dimensioned that in it a turbulent flow is established.

At the point where the one component is contacted with the other component flowing through the conduit, rapid preliminary mixing is effected. The turbulent flow generated thereafter effects a further homogenization of the mixture. When, after the mould has been filled, the supply of the components is stopped, the downpipe will run empty, so that at the small mixing apertures there will be no contact between the two components and hence no polymerization can occur.

In a preferred embodiment of the invention, the two components are tangentially introduced into a radially symmetric chamber, from which they are discharged through an axial conduit at the bottom into the top end of a downpipe. In such a chamber the tangential speed of the liquid decreases towards the circumference. As a result, shearing forces are generated between the rings of liquid rotating in the chamber, which forces effect a fine distribution of the components.

The apparatus for carrying out the process according to the invention is very simple and preferably comprises two concentric conduits, the innermost of which has a closed end and is provided, at or near this closure, with a number of small outlet apertures, the outermost linking up, at the location of the outlet apertures, with a downpipe whose length is at least 5 times its diameter.

In a preferred embodiment the outer conduit connects tangentially to a radially symmetrical chamber and the downpipe connects to a central outlet in the bottom of this chamber.

In general, the invention relates to and can be applied to the polymerization of cyclic amides, e.g. pyrrolidone, caprolactam, oenantholactam, caprylolactam, decanolactam, undecanolactam, dodecanolactam, pentadecanolactam, hexadecanolactam, methyl cyclohexanone isoximes, cyclic hexamethylene adipamide, etc., mixtures of these substances, in the presence of an e.g. anionic) ionogenic catalyst, such as lactam-metal compounds containing a metal atom bound to the lactam nitrogen atom, e.g. sodium caprolactam and potassium caprolactam. It is also possible to use substances which, by reacting with the lactam, produce such lactam metal compounds, e.g. metal alkyl compounds such as diisobutyl aluminum hydride, triethyl aluminum, triisopropyl aluminum, diethyl zinc, and compounds of these metals showing an alkaline reaction, e.g. hydrides, oxides, hydroxides, alcoholates, and carbonates, as also Grignard compounds, e.g. alkyl magnesium bromide and aryl magnesium bromide.

Nitrogen compounds, such as isocyanates, carbodiimides, cyanamides and in general compounds having a tertiary nitrogen atom which is bound to carbonyl, thiocarbonyl, sulphonyl or nitroso groups, and also diimide ethers, e.g. dicaprolactim ether, can be used as the promotor.

BRIEF DESCRIPTION OF THE DRAWING

The invention will be further elucidated with reference to the preferred embodiments shown in the drawing.

DESCRIPTION OF THE PREFERRED EMBODIMENTS

Figure 1:
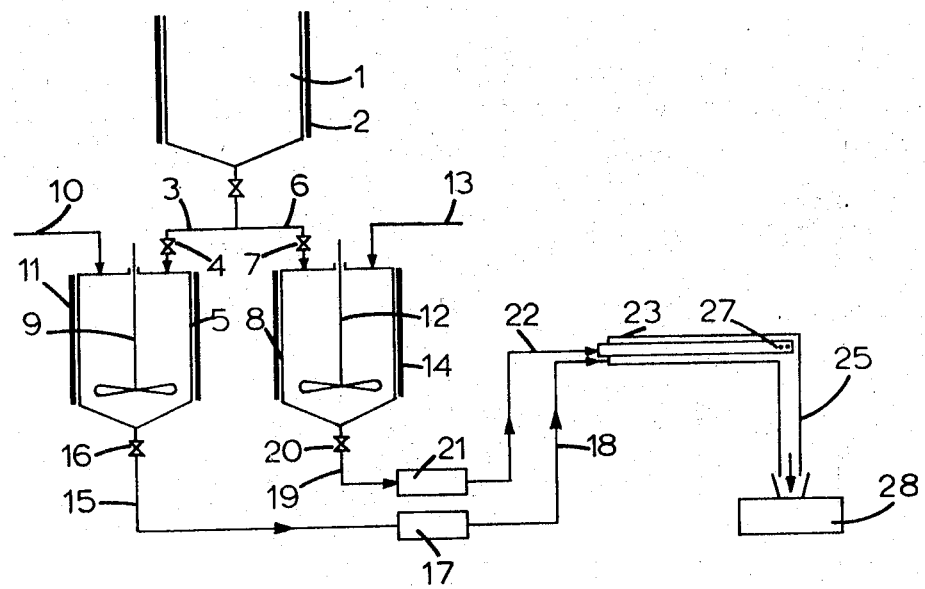
FIG. 1 is a flow diagram of the process according to the invention.

Referring to FIG. 1 a storage vessel 1 receives caprolactam in liquid or solid state, which is stored therein at or raised to a temperature above its melting point (69° C.) by means of heating elements 2. One portion of this lactam is fed into a vessel 5 through a conduit 3 and a valve 4, and another portion is fed to a vessel 8 through a conduit 6 and a valve 7.

In vessel 5 a stirrer 9 mixes the lactam with a polymerization catalyst, e.g. potassium caprolactam, which is supplied through a conduit 10 as a solution in caprolactam. By means of heating elements 11 the temperature of the mixture is raised to about 140° C.

In vessel 8 a stirrer 12 mixes the lactam with a promoter, e.g. dicaprolactim ether, supplied through a conduit 13. By means of heating elements 14 the temperature of the mixture here obtained is likewise raised to 140° C. Preferably the vessels 5 and 8 are closed and contain a dry inert gas, e.g. nitrogen.

By means of a pump 17 the reaction component present in the vessel 5 is fed into a conduit 18 through a valve 16 in discharge conduit 15, and the reaction component present in vessel 8 is pumped into a conduit 22 by a pump 21 through a valve 20 in discharge conduit 19. Preferably the conduits 15, 18 and 19, 22 are enveloped by a steam jacket insulated on the outside, so as to keep the temperature of the reaction components flowing through these conduits at a constant value.

Figure 2:
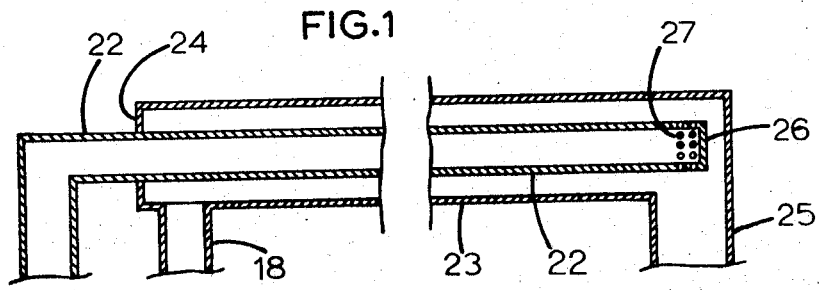
FIG. 2 is a longitudinal sectional view of the mixing device.

In the embodiment shown in FIGS. 1 and 2, the conduit 18 connects to a horizontal tube section 23, which concentrically envelops the horizontally disposed final section of conduit 22. At the inlet end, the tube section 23 is closed by an annular end wall 24, and at the discharge end it connects to a downpipe 25, as hereinafter described.

The inner conduit 22 is closed by an end wall 26. Directly over the downpipe 25 the wall of conduit 22 is provided with a number of small apertures 27, in this particular embodiment with 25 apertures each having a diameter of 1 mm. The liquid component pumped through conduit 22 flows through the apertures and joins the liquid component supplied through tube section 23, so that a good preliminary mixing of the two components is effected. The mixture then flows through the downpipe 25 which has such a diameter that a turbulent flow of liquid component is created within it. If the supply rate is for example 5 litres/min., and the viscosity at 150° C. is 1.2 cp., this condition of turbulent flow is provided in a downpipe 25 having a diameter of 10 mm. The turbulent flow assists the mixing effect. If downpipe 25 has a length of 150 mm. a homogeneous mixture is obtained, whereas the time in which the two components are in contact with each other is so short that no appreciable degree of polymerization takes place. The mixture next flows into a heated mould 28, where it polymerizes to an object of the desired shape.

Figure 3:
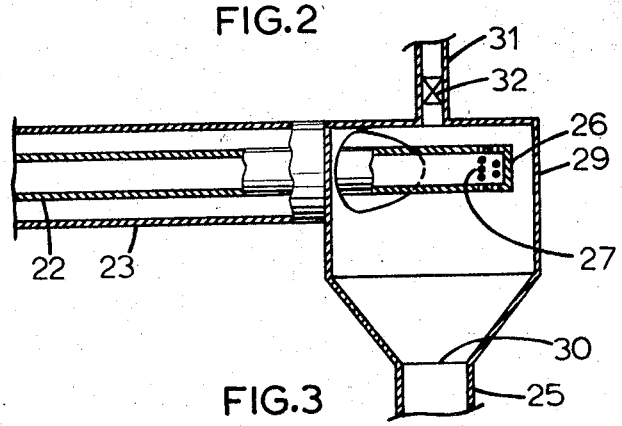
FIG. 3 is a longitudinal sectional view of a modified embodiment of part of the mixing device.

In the embodiment shown in FIG. 3 the tube section 23 connects tangentially with a vortex chamber 29, wherein homogeneous mixing is effected as a result of the rotational flow established therein. The mixture leaves the vortex chamber at the bottom through the discharge downpipe 25 connecting to the central outlet 30.

When the mould has been filled, pumps 17 and 21 are switched off and the valves are closed, so that the downpipe 25 runs empty. Due to the short dwell time of the components in the downpipe, the viscosity of the mixture has not risen markedly and as a result little or no liquid will adhere to the inner wall of the downpipe. If desired, nitrogen may be blown through the downpipe 25 via a tube 31 and valve 32 after filling has been completed in order to prevent oxidation of the reaction mixture by air entering the device.

As the mixing apertures 27 are over downpipe 25, the contact between the two components at the location of the apertures 27 will be discontinued after the pumps have been stopped, so that there will not be any danger of these apertures getting blocked owing to polymerization of the monomer.

What is claimed is:

1. A process for the preparation of high molecular weight polymerization products by anionic catalytic polymerization of lactams, comprising:
    (a) mixing a first portion of lactam monomer with a catalyst to provide a first component;
    (b) mixing a second portion of lactam monomer with a polymerization accelerating promoter to provide a second component;
    (c) mixing the first and second components together in a liquid state by:
        (1) intermittently flowing one of said components in a liquid stream thereof in sufficient quantity to constitute the charge for a mould; and
        (2) forcing the other of said components in a plurality of small individual streams, into said liquid stream only during intervals of flowing of said liquid stream; and
        (3) effecting turbulent vertically falling flow of the resulting mixture; and
    (d) introducing the resulting mixture in substantially unpolymerized condition into a heated mould for polymerization therein.

2. The process of claim 1 wherein step (c)(1) comprises: propelling said liquid stream tangentially into a radially symmetric chamber in a falling spiral toward an axially downward exit; and wherein step (c)(2) includes: conducting the other of said components into said radially symmetric chamber along a path axially within said liquid stream and physically separated from said liquid stream; and forcing the other of said components radially outwardly of said path, within said radially symmetric chamber, in said individual streams and into physical contact with said fluid stream.

References Cited

UNITED STATES PATENTS

| 3,200,095 | 8/1965 | Wichterle et al. | 260—78 |
| 3,239,490 | 3/1966 | Gee et al. | 260—78 |
| 3,017,391 | 1/1962 | Mottus et al. | 260—78 L |
| 3,121,768 | 8/1964 | Boyer | 260—78 LX |

WILLIAM H. SHORT, Primary Examiner

L. M. PHYNES, Assistant Examiner

U.S. Cl. X.R.

23—252, 260, 285